United States Patent Office 3,850,899
Patented Nov. 26, 1974

3,850,899
PROCESS FOR POLYMERIZING OLEFINS AND CATALYST THEREFOR
Shigeru Wada, Otake, Hidesaburo Oi, Yamaguchi-ken, Norio Matsuzawa and Hiroshi Nishimura, Otake, and Juntaro Sasaki, Iwakuni, Japan, assignors to Mitsui Petrochemical Industries, Ltd., Tokyo, Japan
No Drawing. Filed June 14, 1971, Ser. No. 153,014
Claims priority, application Japan, June 15, 1970, 45/51,054; July 17, 1970, 45/62,301, 45/62,302
Int. Cl. B01j 11/84; C08f 1/56
U.S. Cl. 260—88.2 R                    2 Claims

ABSTRACT OF THE DISCLOSURE

In a process for polymerizing alpha-olefins in the presence of a catalyst composed of a pulverized titanium trichloride component and an organoaluminum compound, the improvements wherein an alpha-olefin is polymerized in the presence of a catalyst comprising (A) and (B) below:

(A) A titanium trichloride composition obtained by pulverizing an aluminum-containing titanium trichloride component prepared by the reduction of titanium tetrachloride with metallic aluminum, in the absence of an auxiliary component and without adding an aluminum trihalide or antimony trihalide, until the α- or γ-type crystal type of the titanium trichloride cannot be identified in the X-ray diffraction pattern, and extracting the resulting titanium trichloride composition with a solvent mixture of an inert organic solvent and a member selected from the group consisting of an oxygen-containing organic solvent, a nitrogen-containing organic solvent and Si-containing oragnic solvent; and (B) An organoaluminum compound.

---

This invention relates to an improvement of a catalyst for use in the polymerization of α-olefins, and more specifically to a process for preparing a homo- or copolymer of α-olefins by using a catalyst which exhibits sufficiently high polymerizing activity in the polymerization of α-olefins such as propylene and 1-butene to form a stereospecific polymer.

The Ziegler-Natta catalysts have been well known as catalysts for preparing stereospecific polymers of α-olefins such as propylene, 1 - butene, 4 - methyl-1-pentene or styrene. The most typical of such catalysts is a system composed of a titanium halide and a triethylaluminum or diethylaluminum halide. It is also well known that when α-olefins are polymerized using these catalyst systems, stereospecific polymers can be obtained. It is known however that attempts to increase the polymerization activity of the Ziegler-Natta catalysts generally result in a drastic decrease in the crystallinity of the resultant α-olefin polymer and consequently, an increased amount of an amorphous polymer. The titanium halides now in wide spread use are titanium trichloride compositions, which are produced by (a) reduction of titanium tetrachloride with metallic aluminum, followed by pulverization in a dry condition to activate it, (b) reduction of titanium tetrachloride with hydrogen or metallic titanium, followed by pulverization, or (c) reduction of titanium tetrachloride with an organo-aluminum compound.

However, stereospecific polymerization of α-olefins using a catalyst consisting of a titanium trichloride composition so prepared and an organoaluminum compound results in the formation of great quantities of an amorphous polymer. Usually, therefore, the manufacturing process for stereospecific polymers of α-olefins such as polypropylene involves a step of separating the amorphous polymer.

In the commercial production of typical α-olefin polymers such as polypropylene, poly-1-butene, or poly-4-methyl-1-pentene, increasing the amount of polymer formed per unit amount of catalyst and the minimizing the amount of amorphous polymer are the very important considerations. With increasing amounts of polymer formed per unit amount of catalyst, the amount of catalyst used and can be less, and the catalyst remaining in the polymer can be removed more easily. Consequently, the amount of inorganic component contained in the product is reduced, and the quality of the product can be improved with respect to rust occurrence, color, fish eye, weatherability, transparency and insulating property. This also enables the catalyst preparation step, ash removing step, amorphous polymer separating step, etc. in the process of producing polymers to be simplified and to be even omitted in the case of the latter two steps, and results in a curtailment of the plant constructing cost and the cost of production of polymers.

The non-crystalline polymer formed in the polymerization of α-olefins not only makes the operation of the manufacturing plant complicated, but is totally useless. Such polymer is discarded without utilization, and causes a high price for the stereospecific polymer product. Under the circumstances, therefore, the development of catalysts having high activity and capable of giving highly stereospecific polymers has been desired.

In general, a titanium trichloride composition obtained by reducing titanium tetrachloride with hydrogen, titanium metal, or aluminum metal has low activity for α-olefins, and gives polymers of insufficient crystallinity. With a view to increasing the activity of such catalyst, a method of pulverizing a titanium trichloride composition with a vibratory mill or dry ball mill has been proposed (British Pat. 850,910 and U.S. Pat. 3,032,510).

According to this proposal, the polymerization activity may be increased by the pulverizing treatment, but the crystallinity of the polymer rather tends to be on a decrease. As a result, the stereospecificity of the activated catalyst is worsened, and a great amount of an amorphous polymer is formed.

Another proposal in this line is to reduce titanium tetrachloride with a metal such as aluminum in the presence of an amine, ether or ketone to form a complex compound with aluminum chloride formed, and wash it with an inert solvent, amines or ethers to remove aluminum chloride completely (French Pat. No. 1,315,782). The method proposed is intended to inhibit the formation of an amorphous polymer by removing aluminum chloride in the titanium trichloride composition which is a cause of the formation of the amorphous polymer. Furthermore, owing to severe reaction conditions due to the presence of the amines, ethers or ketones, reaction takes place between the resulting titanium trichloride and these additional compounds, and the polymerization activity of the catalyst and its ability to form a stereospecific ploymer tend to be reduced. It is also usual that the performance of the titanium trichloride catalyst produced under such severe conditions is inferior to that of a titanium trichloride composition activated by pulverization. Another disadvantage of this proposal is that the performance of the catalyst is markedly reduced unless the resulting aluminum trichloride complex is completely removed.

On the other hand, U.S. Pat. 3,032,510 discloses that titanium tetrachloride is reduced with metallic aluminum in the presence of an aromatic hydrocarbon such as benzene and toluene, the resulting titanium trichloride is recovered and pulverized, and the pulverized titanium trichloride is used as a component of the catalyst. This method may lead to an improved polymerization activity, but meets with difficulty in inhibiting the formation of an amorphous polymer.

It is also known that some of the compounds (2), (2)', (2)", and (2)''' to be later described often contribute to an increase in the polymerization activity of the catalyst and/or the crystallinity of the resulting polymer when used in the polymerization system. But the time of utilizing these compounds quite differs from that in the present invention, and the increase is only to an unsatisfactory degree. With these compounds, it is impossible to achieve a remarkable improvement as in the present invention.

It has now been found that stereospecific polymers of α-olefins can be produced with convenient inhibition of the formation of amorphous polymers using a catalyst having superior polymerization activity which comprises an organoaluminum compound and a titanium trichloride composition obtained by pulverizing an aluminum-containing titanium trichloride component prepared by the reduction of titanium tetrachloride with metalic aluminum in the absence of the auxiliary component and without adding an aluminum trihalide or antimony trihalide until the α- or γ-type of the X-ray diffraction pattern of the crystal form of the titanium trichloride cannot be identified, and extracting the resulting titanium trichloride composition with a particular solvent mixture.

The process of the invention has the advantage that a wide range of mixed solvents can be used.

Accordingly, an object of the invention is to provide a process for polymerizing olefins of even more improved crystallinity and a catalyst therefor which exhibits a remarkably increased polymerization activity.

Many other objects and advantages of the invention will become more apparent from the following description.

The process of the invention is differentiated from the first prior proposal given above in that the titanium trichloride component is not one merely pulverized, from the second proposal in that the pulverization must be carried out in the absence of an auxiliary component until the α- or γ-type of the X-ray diffraction pattern of the crystal form of titanium trichloride cannot be identified as the same and extracting the resulting titanium trichloride with a mixed solvent, and also from the third proposal in that titanium trichloride must be pulverized in the absence of an auxiliary component and the pulverized product must be extracted with a mixed solvent. In the present invention, the combination of the aforementioned conditions is essential, and omission of any of such conditions in following prior proposals does not bring about the superior improved effect of the invention. This will be made clearer from the examples and comparative examples which appear later in the specification.

In the present invention, the titanium trichloride component obtained by pulverizing an aluminum-containing titanium trichloride component prepared by the reduction of titanium tetrachloride with metallic aluminum is prepared in a manner well known in the art.

In the preparation of the catalyst of the invention, the aluminum-containing titanium trichloride is first pulverized in the absence of an auxiliary component until the α- or γ-type of the X-ray diffraction pattern of the crystal form of the titanium trichloride cannot be identified. In the invention the pulverization is effected in the absence of the auxiliary component and without adding an aluminum trihalide. It should be noted that the objects of the present invention cannot be achieved even if only a step of extracting and washing titanium trichloride with mixed solvent is carried out with the omission of the pulverizing step. The extraction step must be carried out with a solvent mixture of inert organic solvent (1) and another solvent (2), (2)' or (2)".

A very wide range of compounds are used as an inert organic solvent (1) which is one component of the solvent mixture.

These are inert organic solvents selected from the group consisting of aromatic hydrocarbons, aliphatic hydrocarbons, alicyclic hydrocarbons, halogenated aliphatic hydrocarbons, halogenated aromatic hydrocarbons and carbon disulfide.

Solvents (2), (2)' or (2)" which are another component of the solvent mixture are:

(2) An oxygen-containing organic solvent selected from the group consisting of aliphatic ethers, aromatic ethers, aliphatic carboxylic acid esters, aromatic carboxylic acid esters, aliphatic alcohols, aliphatic aldehydes, aromatic aldehydes, aliphatic carboxylic acids, aromatic carboxylic acids, aliphatic carboxylic acid halides, aromatic carboxylic acid halides, aliphatic ketones, aromatic ketones and phenols;

(2) A nitrogen-containing organic solvent selected from the group consisting of nitrogen-containing heterocyclic compounds, aliphatic secondary amines, aromatic secondary amines, aliphatic tertiary amines, aromatic tertiary amines, aromatic nitriles, aromatic isocyanates and aromatic azo compound; and (2)" Si-containing organic solvent selected from the group consisting of tetrahydrocarbyl silanes, organohydrogenosilanes, organohalogenosilanes, alkoxy silanes, aryloxy silanes, silanol carboxylates, straight chain siloxanes, cyclic polysiloxanes, aminosilanes, silazanes and isocyanate silanes.

Examples of the above inert organic solvent (1) include the following:

Saturated aliphatic hydrocarbons of 3–20 carbon atoms such as propane, butane, pentane, hexane, 3-methylpentane, 2,3-dimethylbutane, n-heptane, 2-methylhexane, n-octane, iso-octane, n-decane, n-dodecane, heptadecane, n-eicosane and kerosene;

Alicyclic hydrocarbons of 3–18 carbon atoms such as cyclopropane, cyclobutane, cyclopentane, cyclohexane, cycloheptane, cyclooctane and dicyclohexyl; methylcyclopropane, ethylcyclobutane, methylcyclohexane, tetramethylcyclohexane and ethylcycloheptane; cyclobutene, 1-methylcyclobutene, cyclopentene, 1,5-dimethylcyclohexane, 1-methylcyclooctene and cyclononene; norbornane, norbornene, decaline, 9-methyldecaline, cycloundene, decahydroacenaphthene, perhydrophenanthrene, perhydroanthracene and perhydrotriphenylene; and spiro-(2,2)heptane and spiro(2,4)heptane;

Aromatic hydrocarbons of 6–20 carbon atoms which may be substituted by $C_1$–$C_{20}$ alkyl radicals, $C_7$–$C_{15}$ aralkyl radicals of $C_6$–$C_8$ aryl radicals such as benzene, toluene, xylene, ethylbenzene, cumene, ethyltoluene, trimethylbenzene, tetramethylbenzene, hexamethylbenzene, 1,2,4,5-tetraisopropylbenzene, cymene, diphenyl, diphenylmethane, diphenylethane, triphenylmethane, naphthalene, α-methylnaphthalene, β-methylnaphthalene, 2,6-dimethylnaphthalene and 1-(n-dodecyl)naphthalene;

Acyclic or cyclic olefins of 2–20, preferably 3–18 carbon atoms having olefinic unsaturation such as ethylene, propylene, butene-1, isobutene, butene-2, hexane-1, octene-1, 3,3-dimethylbutene-1, 4-methyl-1-pentene, nonene-1, octadecene and eicosene; vinylcyclopropane, vinylcyclopropene, vinylcyclohexane, vinylcyclohexene and 1-ethylidene-3-methylcyclohexane; and styrene, stilbene, vinylnaphthalene, triphenylstyrene, α-methylstyrene, allylbenzene and vinylanthracene;

Saturated aliphatic hydrocarbon halides of 1–20 carbon atoms such as methyl iodide, ethyl chloride, ethyl bromide, ethyl iodide, butyl fluoride, n-butyl chloride, n-butyl bromide, n-butyl iodide, hexyl fluoride, octyl bromide, n-nonyl iodide and cetyl chloride; methylene chloride, methylene bromide, methylene iodide, fluorobromomethane, ethylidene chloride, ethylidene bromide, ethylidene iodide and propylidene chloride; ethylene dichloride, ethylene dibromide, ethylene diiodide, propylene chloride, trimethylene bromide and octamethylene chloride; chloroform, iodoform, bromoform, carbon tetrachloride, sym-tetrachloroethane, pentachloroethane, hexachloroethane and hexabromoethane; and difluorodichloromethane and fluoroform;

Unsaturated aliphatic hydrocarbon halides of 2–20 carbon atoms such as vinyl chloride, vinyl bromide, allyl chloride, allyl bromide, allyl iodide, isopropenyl chloride and isopropenyl iodide; 1,2-dichloroethylene, 1,2-dibromoethylene, 1,2-diiodoethylene, 1,1-dichloroethylene, 1,1-difluoroethylene, trichloroethylene and tetrachloroethylene; and 2,5-dibromo - 2,5- dimethylhexene-3,1,5-bromopentadecene-(1) and 14-bromo-2,6-dimethyltetradecene-(2);

Haloderivatives of aromatic hydrocarbons of 6–16 carbon atoms such as chlorobenzene, bromobenzene, iodobenzene, fluorobenzene, o-, m-, p-dichlorobenzenes, o-, m-, p-dibromobenzenes, o-, m-, p-diiodobenzenes, 1,2,4,5-tetrachlorobenzene hexachlorobenzene, pentabromobenzene, 2-fluoro-1-chlorobenzene and 4-bromo-1-iodo-benzene; o-, m-, p-fluorotoluenes, o-, m-, p-bromotoluenes, 2-chloro-m-xylene, 1,2,4,5-tetramethyl-3-chlorobenzene and aniyl-4-bromobenzene benzyl chloride, benzylidene chloride, 1-chloronaphthalene, 1-bromonaphthalene and 1-fluoronaphthalene; 5-chlorotetraline, 2-bromodihydronaphthalene and 1,2,3,4,5,8-hexachlorotetraline; 1-chloro-2-methylnaphthalene, 1-chloro-2-phenylnaphthalene, 1-chloro(4-chloromethyl)naphthalene, 1,4-dichloronaphthalene, 2,4-dibromo - 1 - chloronaphthalene, 1,3,6,7-tetrabromonaphthalene and octachloronaphthalene; and 2-chloroanthracene, 1-chloroanthracene, 2,3-dibromoanthracene and 1,9,10-trichloroanthracene.

Examples of the above solvent (2), (2)' and (2)" include the following:

As oxygen-containing organic solvents of (2), the following examples can be mentioned.

Saturated aliphatic monoethers of 2–32 carbon atoms having an alkyl radical such as dimethyl ether, diethyl ether, di-n-propyl ether, diisopropyl ether, di-n-butyl ether, diisobutyl ether, methyl ethyl ether, methyl n-butyl ether, n-butyl n-pentyl ether, dioctyl ether, isoamyl cetyl ether, dicetyl ether, 2,2'-dibromodiethyl ether and 2,2'-dichlorodiethyl ether;

Aliphatic ethers of 3–20 carbon atoms having at least one unsaturated aliphatic hydrocarbon radical such as 2-methoxybutene, methyl methacryl ether, allyl ethyl ether, allyl butyl ether, 2-ethoxypropene, 6-methoxy-1-hexene, ethyl vinyl ether, methyl vinyl ether, 1-methoxy-2-octene, undecenyl ethyl ether and didecenyl ether;

Aromatic ethers of 7–16 carbon atoms having a saturated alkyl or aryl radical such as anisole, phenetole, isopropyl phenyl ether, tolyl methyl ether, diphenyl ether, ditolyl ether, dimethoxybenzene, 1-ethoxynaphthalene and 1-phenoxynaphthalene;

Monoethers and diethers of 7–16 carbon atoms which are halogenated and contain at least one aromatic radical, preferably with 7 to 16 carbon atoms, such as chloroanisole, bromoanisole, 4,4'-dibromophenyl ether, 2,4-dichloroanisole, 3,5 - dibromoanisole, 2,6 - diiodonanisole, 2,3,5-trichloroanisole and bromophenetole;

Saturated aliphatic monocarboxylic acid saturated alkyl esters having an aliphatic monocarboxylic acid residual group of 1–21 carbon atoms and a saturated alkyl radical of 1–16 carbon atoms such as methyl formate, ethyl formate, butyl formate, ethyl acetate, n-butyl acetate, sec-butyl acetate, octyl acetate, butyl butyrate, methyl caproate, amyl caprylate, ethyl laurate, methyl palmitate, ethyl stearate and cetyl palmitate;

Saturated aliphatic monocarboxylic acid unsaturated alkyl esters having a saturated aliphatic monocarboxylic acid residual group of 1–8 carbon atoms and an unsaturated alkyl radical of 2–12 carbon atoms such as vinyl acetate, allyl acetate, propenyl acetate, undecenyl acetate and hexenyl propionate;

Unsaturated monocarboxylic acid alkyl esters having an unsaturated aliphatic monocarboxylic acid residual group of 2–12 carbon atoms and a saturated or unsaturated alkyl radical of 1–10 carbon atoms such as methyl, acrylate, n-amyl acrylate, n-decyl acrylate, ethyl crotonate, methyl isocrotonate, methyl methacrylate, n-butyl methacrylate, methyl undecylenate, methyl 3-methyltetradecenate-(13), phenyl acrylate and vinyl undecylenate;

Aromatic monocarboxylic acid saturated alkyl esters having an aromatic monocarboxylic acid residual group of 7–18 carbon atoms and an alkyl radical of 1–20 carbon atoms such as methyl benzoate, ethyl benzoate, butyl benzoate, n-propyl benzoate, iso-propyl benzoate, sec-butyl benzoate, tert-butyl benzoate, n-amyl benzoate, isoamyl benzoate, neopentyl benzoate, ethyl o-, m-, p-toluylates, butyl o-, m-, p-toluylates, ethyl o-, m-, p-bromobenzoates, ethyl o-, m-, p-chlorobenzoates, ethyl 1,2-naphthoate and butyl 1,2-naphthoate;

Saturated aliphatic monoalcohols of 1–18 carbon atoms such as methanol, ethanol, n-propanol, isopropanol, n-butanol, isobutanol, sec-butanol, tert-butanol, 1-pentanol, isoamyl alcohol, neopentyl alcohol, 3-pentanol, 3-methylbutanol-2, hexanol, octanol, lauryl alcohol, cinnamyl alcohol, phenyl ethanol, cetyl alcohol, ethoxy ethanol, 2-chloropropanol, 2-bromopropanol, 3-chloropropanol, ethoxybutanol and 4-chlorobutanol;

Monohydric and dihydric phenols of 6–16 carbon atoms such as phenol, o-, m-, p-cresols, thymol, o-chlorophenol, o-bromophenol, p-chlorophenol, p - bromophenol, tribromophenol, catechol, resorcinol, guaiacol, eugenol, isoeugenol, o-allylphenol, 1-, 2-naphthols and anthranol;

Saturated aliphatic ketones of 3–20 carbon atoms such as acetone, methyl ethyl ketone, methyl propyl ketone, methyl isobutyl ketone, methyl tert-butyl ketone, ethyl butyl ketone, dibutyl ketone, methyl amyl ketone, ethyl amyl ketone, 2-chlorobutyl ketone, ethyl 2-chlorobutyl ketone and 2-ethoxyethyl methyl ketone;

Saturated aliphatic diketones of 4–12 carbon atoms such as acetylacetone, diacetyl and acetonylacetone;

Aromatic monoketones of 7–18 carbon atoms such as acetophenone, ethyl phenyl ketone, benzophenone, dypnone, cinnamyl methyl ketone, cinnamyl ethyl ketone, n-butyl phenyl ketone, tert-butyl phenyl ketone, propyl phenyl ketone, anthraquinone, anthrone, 2-acetylnaphthalene, naphthoquinone, benzoquinone and fluorenone;

Aromatic monocarboxylic acids of 7–18 carbon atoms such as benzoic acid, o-, m-, p-toluic acids, o-, m-, p-chlorobenzoic acids, o-, m-, p-bromobenzoic acids and 1-, 2-naphthoic acids;

Saturated aliphatic monocarboxylic acids of 1–20 carbon atoms such as formic acid, acetic acid, propionic acid, valeric acid, octylic acid, undecylenic acid and stearic acid;

Saturated aliphatic carboxylic acid halides of 2–12 carbon atoms such as acetic acid chloride, propionic acid chloride and lauric acid chloride; and Aromatic carboxylic acid halides of 7–15 carbon atoms such as benzoic acid chloride, o-, m-, p-toluic acid chlorides, o-, m-, p-chlorobenzoic acid chlorides and 1-, 2-naphthoic acid chlorides.

It has been known that when some of the above organic oxygen-containing compounds are added as a promoter to the reaction system at the time of polymerization, the polymerization activity of the catalyst can be improved by about 10–30% and the crystallinity of the obtained polymer can also be improved. However, the improvement of polymerization activity and the improvement of crystallinity of the obtained polymer achieved by the method of the present invention are far superior to those attainable by the prior art.

As nitrogen-containing organic solvents of (2)', the following examples can be mentioned.

Saturated aliphatic secondary amines of 2–24 carbon atoms such as dimethylamine, diethylamine, dibutylamine and didodecylamine;

Saturated aliphatic tertiary amines of 3 to 30, preferably 3–18 carbon atoms such as trimethylamine, tributylamine and trihexylamine;

Aromatic secondary amines of 6–20 carbon atoms and aromatic tertiary amines having 8 to 30 carbon atoms such as aniline, o-, m-, p-toluidines, xylidine, naphthylamine, N-methylaniline, N-ethylaniline, N,N-dimethylaniline, diphenylamine and triphenylamine;

Heterocyclic amines of 5–18 carbon atoms such as pyridine, 2-picoline, 3-picoline, 5-ethyl-2-methyl pyridine, 2-phenyl pyridine, 1,2,3,4-tetramethylpyridine, 2-chloropyridine, 2-bromopyridine, 3-chloropyridine, 3-chloropyridine, 3-iodopyridine, 3,4-dichloropyridine, 2,3,4-trichloropyridine, 2,3,4,6-tetrachloropyridine, pentachloropyridine, 2,3-dibromopyridine, 2,3,5 - tribromopyridine, 2-chloro - 6 - methyl pyridine, 2 - chlorophenyl pyridine, quinoline, isoquinoline, 2-methylquinoline, 3-phenyl quinoline, 6-methyl quinoline, 2,4-dimethyl quinoline, 4,6-dimethyl-2-phenyl quinoline, 3-fluoroquinoline, 4-bromoquinoline, 2,6 - dichloroquinoline, 5,6 - diiodoquinoline, 6-bromo-2-chloroquinoline, 1-methylisoquinoline, 1,3 - dimethylisoquinoline, 4-bromoisoquinoline, acridine and 2-chloroacridine;

Aromatic mononitriles of 7–15 carbon atoms such as benzonitrile, o-, m-, p-tolunitriles, dimethylbenzonitrile, 4-isopropyl benzonitrile, α-naphthonitrile, β-naphthonitrile and 9-cyanoanthracene;

Aromatic monoisocyanates of 7–11 carbon atoms such as phenyl isocyanate, toluyl isocyanate, α-naphthyl isocyanate, β-naphthyl isocyanate and 2,4-dimethyl phenyl isocyanate; and Aromatic azo compounds of 12–20 carbon atoms having no substituent other than hydrocarbon radicals or halogens such as azobenzene, o-, m-, p-azotoluenes, 1,1'-azonaphthalene and 2,2'-azonaphthalene.

As silicon-containing organic solvents of (2)″ (which in the present invention includes the cases where oxygen, nitrogen or sulphur is contained besides silicon), the following examples can be mentioned.

Monomer type compounds (which contain one silicon atom in the molecule) represented by the general formula:

$$R_nSiY_{4-n}$$

wherein R's are alkyl or aryl radicals, Y's are substituents of various kinds, and $n$ is 1 to 4.

$n=4$: Tetrahydrocarbylsilanes having saturated alkyl radicals and/or aryl radicals of 4–50 carbon atoms such as tetramethylsilane, tetraethylsilane, tetrabutylsilane, tetraundecylsilane, tetra-n-octadecylsilane, ethyltrimethylsilane, trimethylpropylsilane, diethyldiphenylsilane, ethyltriphenylsilane, tetraphenylsilane, tetra (o-tolyl)silane, tetrabenzylsilane, tetra(p-diphenyl)silane and 2-naphthyltriphenylsilane.

$n=4$: Tetrahydrocarbylsilanes having an unsaturated alkyl radical of 5–28 carbon atoms such as trimethylvinylsilane; isopropenyltrimethylsilane, vinyltriphenylsilane, benzylvinylsilane and trimethylallylsilane.

$n=1$ to 3, Y=hydrogen: Saturated or unsaturated alkyl or aryl hydrogenosilanes of 1–30 carbon atoms having at least one Si—H bond such as methylsilane, dimethylsilane, trimethylsilane, tri-n-propylsilane, diphenylsilane, triphenylsilane, tritolylsilane and diphenylvinylsilane.

$n=1$ to 3, Y=halogens: Saturated or unsaturated alkyl or aryl halogenosilanes of 3–30 carbon atoms having at least one Si-halogen bond such as trichloromethylsilane, dichlorodimethylsilane, tripropylchlorosilane, diallyldichlorosilane, phenyltrichlorosilane, diphenyldichlorosilane, triphenylchlorosilane, tribenzylchlorosilane, triethylfluorosilane, diphenyldifluorosilane, triethylbromosilane, diphenyldibromosilane, triethyliodosilane, chlorodifluoromethylsilane, chloroethyldifluorosilane and dichlorofluoromethylsilane.

$n=1$ to 3, Y=NH$_2$: Trialkyl or triaryl silyl amines or their N-alkylamino derivatives such as triethylsilylamine, tripropylsilylamine, triphenylsilylamine, trimethyl (N-methylamino)silane or other trialkyl (N-alkylamino)silanes and trimethyl (N,N-diethylamino)silane.

$n=1$ to 3, Y=alkoxy or aryloxy: Saturated alkyl or aryl silanes having at least one Si-O-C bond such as methoxymethylsilane, dimethoxydimethylsilane, trimethoxymethylsilane, diethoxydimethylsilane, ethoxytriethylsilane, diethoxydiethylsilane, trimethylphenoxysilane and triethylphenoxysilane.

$n=1$ to 3, Y=OCOR (R:alkyl, aryl): C$_1$–C$_{10}$ aliphatic or C$_7$–C$_{11}$ aromatic monocarboxylic acid esters of C$_3$–C$_{10}$ trialkyl, C$_8$–C$_{20}$ alkylaryl or C$_{18}$–C$_{30}$ triaryl silanols such as trimethylacetoxysilane, triethylacetoxysilane, triphenylacetoxysilane, trimethylbenzoyloxysilane, trimethylpropionylsilane and triethylcaproylsilane.

$n=1$ to 3, Y=NCO (isocyanato): Organosilicon monoisocyanates having C$_3$–C$_{10}$ trialkyl, C$_8$–C$_{15}$ dialkylaryl or C$_{19}$–C$_{30}$ triaryl such as trimethyl silicon isocyanate, dimethyl silicon isocyanate, tributyl silicon isocyanate and triphenyl silicon isocyanate.

Polymer type compounds (which contain at least two silicon atoms in the molecule):

Polysilmethylenes represented by the formula $$CH_3SiCH_2[(CH_3)_2SiCH_2]_xSi(CH_3)_3$$

(wherein $x=1$ to 10) such as hexamethyldisilmethylene, hexaethyldisilmethylene, hexa - n - propyldisilmethylene, decamethyltetrasilmethylene and dodecamethylpentasilmethylene are typical, but in general the polysilmethylenes are represented by the general formula $$R_3SiCH_2[RSiCH_2]_nSiR_3$$

(wherein R's are alkyl or aryl radicals).

Linear polyalkyl or polyaryl polysilanes of 6–80 carbon atoms such as hexamethyldisilane, sym-diethyldi-n-propyldiphenyldisilane, sym-diethyldi-n-propyldibenzyl disilane, hexaphenyldisilane, hexa(p-diphenyl)disilane and octaphenyltrisilane.

As derivatives thereof, alkoxy polysilanes such as 1,1,2,2-tetramethyl-1,2-diethoxydisilane and pentamethylethoxydisilane.

Polyalkyl and/or polyaryl cyclopolysilanes of 12–120 carbon atoms such as dodecamethylcyclohexasilane and octaphenylcyclotetrasilane.

Dialkylpolysilanes, alkylarylpolysilanes and diarylpolysilanes which are linear molecules represented by the general formula:

$$R(R'R''SiO)_xSiR_3$$

wherein R, R', R'' are the same or different, represent alkyl radical of 1–4 carbon atoms, aryl radical of 6–8 carbon atoms or hydrogen, and $x$ stands for an integer of 1–1000, such as hexamethyldisiloxane, decamethyltetrasiloxane, tetracosmethylundecasiloxane, 3-hydroheptamethyltrisiloxane, 3,5-dihydroctamethyltetrasiloxane, 3,5,7-trihydrononamethylpentasiloxane, tetramethyl-1,3-diphenyldisiloxane, pentamethyl-1,3,5 - triphenyltrisiloxane, hexaphenyldisiloxane and octaphenyltrisiloxane.

As compounds obtained by halogenating both ends of the molecule of the above compounds, α,ω-dihaloalkylpolysiloxanes represented by the general formula:

$$X(R_2SiO)_xSiR_2X$$

wherein X is a hologen atom and $x=1$ to 1000, such as 1,3-dichlorotetramethyldisiloxane, 1,5-dichlorohexamethyltrisiloxane and 1,7-dichlorooctamethyltetrasiloxane are representative.

Alkylcyclopolysiloxanes represented by the general formula:

$$(R'''HSiO)_y$$

wherein R''' is an alkyl radical of 1–4 carbon atoms, $y$ stands for an integer of 3 to 8, such as 2,4,6-trimethylcyclotrisiloxane and 2,4,6,8 - tetramethylcyclotetrasiloxane.

Alkylcyclopolysiloxanes represented by the general formula:

$$(R''''_2SiO)_z$$

wherein R'''' is an alkyl radical of 1–4 carbon atoms, $z$ stands for an integer of 3 to 9, such as hexamethylcyclotrisiloxane, octamethylcyclotetrasiloxane, decamethylcyclopentasiloxane and dodecamethylcyclohexasiloxane.

Arylcyclopolysiloxanes represented by the general formula:

$$(Q_2SiO)_p$$

wherein Q is an aryl radical of 6–8 carbon atoms and $p$ stands for an integer of 3 to 6, such as 1,3,5-triphenyl-1,3,5 - trimethylcyclotrisiloxane, hexaphenylcyclotrisiloxane and octaphenylcyclotetrasiloxane.

Alkyl or aryl polysilazanes having 6–50 carbon atoms and a molecular weight not more than 1000 such as hexamethylsilazane, hexamethyltrisilazane, N-methylhexamethylsilazane, octamethylcyclotetrasilazane, hexaphenyl cyclotrisilazane, hexaethylcyclotrisilazane, hexaphenylcyclotrisilazane, hexa(n-butyl)cyclotrisilazane and hexaphenylcyclotrisilazane.

In the present invention, any methods of pulverizing titanium trichloride obtained by reduction of titanium-tetrachloride with metallic aluminum can be used which are capable of pulverizing the titanium trichloride composition until the α- or γ-type of the X-ray diffraction pattern of the crystal of titanium trichloride cannot be identified. For example, such physical or mechanical pulverizing means as ball mill pulverization, vibratory mill pulverization and impact mill pulverization may be cited. The pulverizing step is carried out in the absence of the auxiliary component.

The pulverization may be carried out at room temperature, but if desired, it may be performed at lower or higher temperatures, for instance, −20° C. to +100° C. The pulverization can be performed in an atmosphere of an inert gas such as nitrogen gas, and if desired, other inert gas such as argon and helium.

The amount of the solvent mixture and the ratio of the inert organic solvent to the other solvent (2), (2)' or (2)" are optional, but generally, the amount of the solvent mixture is 1 to 100 parts by weight per part of the pulverized titanium trichloride composition. The other solvent (2), (2)' or (2)" may be used in an amount of 0.005 to 10.0 parts by weight per part of the titanium trichloride composition.

In the case of using the mixed solvent containing the organic oxygen-containing compound (2) mentioned above, the amount of the oxygen-containing compound is 0.005 to 10.0 parts by weight per part of the titanium trichloride composition, preferably 0.01 to 10.0 parts for ethers, 0.01 to 5.0 parts for ketones and esters, 0.005 to 0.3 part for alcohols, 0.005 to 0.2 part for phenols and aldehydes, and 0.005 to 0.5 part for carboxylic acid halides and carboxylic acids.

In the case of the mixed solvent containing the organic nitrogen-containing compound (2)', the amount of the organic nitrogen-containing compound is usually 0.005 to 0.5 part by weight per part of the titanium trichloride composition, preferably 0.01 to 0.5 part by mole for heterocyclic amines (nitrogen-containing heterocyclic compound) and aromatic tertiary amines, 0.01 to 0.3 mol part for tertiary amines, isocyanates, azo compounds and nitriles, and 0.005 to 0.2 mol part for secondary amines.

In the case of the mixed solvent containing the organic silicon-containing compounds, there is no particular limitation on the ratio of the amount of such compound to that of the titanium trichloride composition. However, the preferred range of the amount per part by weight of the titanium trichloride composition is 0.05 to 10 parts by weight for organohalogenosilanes, 0.05 to 5.0 parts by weight for organoalkoxy silanes, aryloxy silanes and organopolysiloxanes, 0.02 to 2.0 parts by weight for organosilanol carboxylic acid esters and organosilazanes, and 0.02 to 1.0 part by weight for the organisocyanate silanes (alternatively called organosilicon isocyanate). The preferred amount of organosilanols is 0.02 to 1.0 part by weight, and that of organosilthianes is 0.02 to 2.0 parts by weight.

When preparing a mixed solvent comprising various compounds selected from (1), (2), (2)' and (2)" mentioned above, these compounds should be mixed at the ratios described above. The ratio of an amount of the inert organic solvent (1) to the other solvent (2), (2)' and (2)" may be varied at any desired ratios, but generally, the amount of the inert solvent is larger.

There is not any particular restriction on the extraction of the pulverized titanium trichloride composition with the mixed solvent. It may be contacted with the mixed solvent at room temperature, or at elevated temperatures with stirring, or under cooling. Generally, the contacting may be performed at from −60° to 100° C., usually at 20–100° C. for several minutes to several days. At this time, it is desirable to perform the separation of the mixed solvent from the titanium trichloride composition as sufficiently as possible. For this purpose, it is preferable to wash or extract and wash the separated composition further with a pure inert organic solvent (1). Such a washing operation can be carried out a plurality of times.

Such treatment may be effected by a batchwise washing method, or extraction with a Soxhlet extractor, or by a continuous countercurrent washing. By any of these methods, the mixed solvent used should be separated from the treated titanium trichloride composition as far as possible.

The extracted and separated titanium trichloride composition thus obtained may be stored in an oxygen-free and water-free condition in the form of slurry in an inert organic solvent (1) or in the form of dried powder. The drying step can be carried out at a temperature as low as possible under the same conditions as described above.

The catalyst used in the present invention consists of an organoaluminum compound and the titanium trichloride composition obtained by the aforementioned procedure. Any organoaluminum compounds can be used which are known as one component of the Ziegler-Natta type catalyst.

Examples of such organoaluminum compounds include, for instance, trialkylaluminum, dialkylaluminum halides, dialkylaluminum alkoxides, alkylaluminum alkoxy halides, alkylaluminum dihalides, reaction products of these with electron-donor compounds, or reaction products of these with alkali metal halides or alkali metal complex fluorides of transition metals. Examples of the electron-donor compounds are described, for example, in U.S. Pats. Nos. 3,081,287, 2,116,274 and 3,230,208.

The α-olefin monomers to be polymerized with the catalyst of the invention are, for instance, propylene, 1-butene, 4-methyl-1-pentene, styrene, 1-pentene, 3-methyl-1-butene, and trimethyl vinyl silane. The catalyst can also be applied to the copolymerization of ethylene with propylene, ethylene with 1-butene, ethylene with 1-hexene, or propylene with styrene, and also to the homopolymerization of ethylene.

The polymerization of α-olefins using the catalyst of the invention may be performed by any known means under known conditions. For instance, the polymerization can be performed at a temperature of 20 to 100° C. and a pressure of normal atmospheric pressure to 100 kg./cm.² The polymerization may be conducted in an inert solvent or in the absence of a solvent where the liquefied monomer acts as a solvent in some cases either batchwise or continuously.

In the polymerization of olefins according to the process of the invention, hydrogen may be used as a molecular weight regulating agent for olefin polymers. After completion of the polymerization, the catalyst is generally deactivated with lower alcohols such as methanol, ethanol, butanol, and isopropanol in the same way as the Ziegler-Natta type polymerization of olefins. But where the yield of polymer per unit amount of the catalyst is large, the aforementioned deactivating treatment may be omitted, and the catalyst may merely be contacted with air or water vapor.

The invention will further be described by the following examples and comparative Examples which are not intended to limit the invention in any way.

EXAMPLES 1 TO 2, CONTROL AND COMPARATIVE EXAMPLES 1 TO 6

Preparation of metallic aluminum-reduced titanium trichloride

Titanium tetrachloride (4 liters) was reacted with 54.0 g. of metallic aluminum powders in the presence of 3.0 g. of aluminum chloride in a stainless steel autoclave at the boiling point of titanium tetrachloride for 20 hours. Unreacted titanium tetrachloride and free aluminum chloride were removed by distillation at atmospheric pressure from the titanium trichloride composition which was obtained. The remaining solid was heated for 5 hours at 200° C. at a reduced pressure of 0.2 mm. Hg to remove the remaining titanium tetrachloride. As a result 1153 g. of a light reddish purple titanium trichloride composition (to be abbreviated as TiCl$_3$A hereinafter) were obtained.

Activation of TiCl$_3$ 120 grams of this titanium trichloride composition were put into a cylindrical stainless steel vessel having an inner capacity of 800 ml., and milled at 140 r.p.m. for about 24 hours in an atmosphere of nitrogen in the presence of 850 stainless steel balls each having a diameter of 10 mm. until the $\alpha$-, $\gamma$-type of the X-ray diffraction pattern of the titanium trichloride component could not be identified.

The particle size adjustment of the pulverized component for the removal of fine particles having up to 40$\mu$ in diameter was carried out in an atmosphere of nitrogen.

Extraction

The pulverized composition was extracted for 2 hours at 70° C. with the solvent consisting of 5 molar parts of toluene and 0.5 molar part of anisole per molar part of the composition indicated in Table I–a using a Soxhlet extractor equipped with a glass filter to form a titanium trichloride composition to be used as a component of the catalyst.

Polymerization of propylene

A 1-liter glass separable four-necked flask equipped with a stirrer, a thermometer, a propylene inlet and an exhaust pipe was charged with 500 ml. of refined kerosene, and purged with nitrogen with substantial stirring. The titanium trichloride component (2.00 g.) obtained above and 10 millimols of diethylaluminum chloride were added in this order in an atmosphere of nitrogen, and the temperature was raised to 70° C. Thereafter, propylene was introduced and polymerized for 2 hours at atmospheric pressure. After completion of the polymerization, the propylene was replaced by nitrogen gas, and the temperature was decreased. Methanol (100 ml.) was added to deactivate the catalyst. The polymer slurry was filtered, and the powdery solid obtained on a filter plate was washed several times with methanol, and dried for 2 days at 70° C. under a reduced pressure of 50 mm. Hg to yield a solid propylene polymer. The results obtained are shown in Table I–a. This table also shows the results obtained in the control in which propylene was polymerized in the same manner as in Example 1 except using the titanium trichloride composition not pulverized; Comparative Example 1 in which propylene was polymerized in the same way as set forth in Example 1 except that the extracting treatment of the titanium trichloride composition was omitted; Comparatively Example 2 in which the procedure of Example 1 was repeated except that the titanium trichloride composition used in control was extracted and washed in the same way as in Example 1, and the resulting titanium trichloride composition was used; Comparative Example 3 in which the procedure of Example 1 was repeated except that a titanium trichloride composition was first extracted and washed with a solvent and then pulverized; Comparative Example 4 in which the procedure of Example 1 was repeated except that a titanium trichloride composition obtained by extracting the titanium trichloride composition used in Comparative Example 3 further with two solvents one by one was used; Comparative Example 5 in which the procedure of Example 1 was repeated except that a titanium trichloride composition obtained by reducing titanium tetrachloride with metallic aluminum in the presence of anisole and without pulverizing, extracted with a solvent in the same manner as set forth in Example 1 was used; and Comparative Example 6 in which the procedure of Example 1 was repeated except that a titanium trichloride composition used was obtained by reducing titanium tetrachloride with hydrogen.

In all of the tables appearing in this specification, T.I. stands for total isotacticity which expresses the percentage of the weight of polymer difficulty soluble in a specific extracting solvent (usually heptane) based on the weight of total polymer formed (a portion of the polymer readily soluble in a polymerization solvent is weighed after evaporation of the solvent, and included in the weight of the total polymer). On the other hand, partial isotacticity indicates the percentage of the weight of a polymer insoluble in a specific extracting solvent based on the weight of polymer excluding the weight of a portion readily soluble in a polymerization solvent. Usually, therefore, the total isotacticity is smaller than the partial isotacticity, A.D. is an abbreviation of apparent density; the weight of the polymer is expressed in grams and its apparent volume, in cubic centimeters.

TABLE I-a

| | TiCl$_3$ component | | | | Polypropylene | |
|---|---|---|---|---|---|---|
| | | Milling treatment step, yes or no | Extraction treatment step | | | |
| | Reduction | | Yes or no | Solvent | Organo-aluminum compound | Total yield (g.) | T.I. (percent) |
| Example 1 | Al | Yes | Yes | Toluene plus anisole | (C$_2$H$_5$)$_2$AlCl | 153.2 | 96.0 |
| Example 2* | Al | No | Yes | do | (C$_2$H$_5$)$_2$AlCl | 171.2 | 95.7 |
| Control | Al | No | No | | (C$_2$H$_5$)$_2$AlCl | 6.5 | 93.3 |
| Comparative 1 | Al | Yes | No | | (C$_2$H$_5$)$_2$AlCl | 71.0 | 88.8 |
| Comparative 2 | Al | No | Yes | Toluene plus ansole | (C$_2$H$_5$)$_2$AlCl | 6.7 | 92.9 |
| Comparative 3 | Al | Yes | Yes | Toluene plus anisole (extracted before milling). | (C$_2$H$_5$)$_2$AlCl | 62.3 | 86.9 |
| Comparative 4 | Al | Yes | Yes | 1st anisole, 2nd toluene (extracted with two solvents one by one). | (C$_2$H$_5$)$_2$AlCl | 53.2 | 93.1 |
| Comparative 5 | Al plus (toluene/anisole)** | No | Yes | Toluene plus anisole | (C$_2$H$_5$)$_2$AlCl | 10.3 | 94.0 |
| Comparative 6 | Hydrogen | Yes | Yes | do | (C$_2$H$_5$)$_2$AlCl | 66.2 | 86.3 |

*TiCl$_3$AA manufactured by Stauffer Chemical Co. was used.
**TiCl$_3$ was prepared in the presence of 6 ml. of toluene by reacting 1 mol of TiCl$_4$, 10.8 ml. of anisole and 0.1 mol of Al powder for 12 hrs., then filtering, washing with toluene three times and dried.

EXAMPLES 3 TO 35 AND COMPARATIVE EXAMPLES 7 TO 10

The polymerization of propylene was performed in the same way as set forth in Example 2 using either the titanium trichloride composition to be abbreviated as TiCl₃(A)] obtained in the same way as in Example 2 but omitting the pulverizing treatment or activated titanium trichloride composition [to be abbreviated as TiCl₃(AA)] which was obtained by putting 120 g. of washed titanium trichloride composition into an 800 ml. stainless steel cylindrical vessel and activating it by a vibratory mill in the presence of 850 stainless steel balls each having a diameter of 10 mm., followed by particle size adjustment in an atmosphere of nitrogen and removal of the titanium trichloride composition having fine particles. The results obtained are given in Table I-b.

of the same titanium trichloride component as used in Example 2 was mounted in a thermometer fitting pipe in the autoclave so that upon rotation of a stirrer, the stirring vanes would collide with the ampoule and break it. The inside of the autoclave was further purged with propylene gas, and 600 g. of propylene and 7.5 millimols of diethylaluminum chloride were introduced into the autoclave at room temperature, followed by introduction of 2200 ml. of hydrogen. The system was heated to 50° C., and then the stirrer was operated. On breakage of the ampoule, the polymerization of propylene was started. After polymerizing for 4 hours, unreacted propylene was TABLE I-b

| | TiCl₃ component | | | | Polypropylene | | |
|---|---|---|---|---|---|---|---|
| | Extraction solvents | | Extraction conditions | | Total yield (g.) | T.I. (percent) | A.D. (g./cc.) |
| | Class | Amount¹ | °C. | Hours | | | |
| Example 3 | Toluene / Ethyl ether | 30 / 0.20 | r.t. | 28 | 125.7 | 95.7 | 0.365 |
| Example 4 | Toluene / n-Butyl ether | 30 / 0.50 | 70 | 2 | 206.5 | 94.6 | 0.377 |
| Example 5 | Toluene / Tetrahydrofuran | 30 / 0.20 | r.t. | 28 | 92.6 | 95.0 | 0.330 |
| Example 6 | Toluene / p-Chloroanisole | 30 / 0.20 | r.t. | 8×24 | 145.8 | 95.8 | 0.346 |
| Example 7 | Toluene / Phenetole | 30 / 3.00 | 70 | 2 | 93.5 | 94.6 | 0.351 |
| Example 8 | Toluene / Methyl ether | 30 / 0.20 | r.t. | 28 | 115.3 | 95.3 | 0.379 |
| Example 9 | Toluene / Ethylbutyl ether | 30 / 0.20 | r.t. | 28 | 132.3 | 94.9 | 0.366 |
| Example 10 | Toluene / Phenyl ether | 30 / 3.00 | r.t. | 12 | 129.0 | 95.1 | 0.352 |
| Example 11² | Toluene / Anisole | 5 / 0.5 | 70 | 2.0 | 383.1 | 96.3 | |
| Comparative 7² | | | | | 163 | 90.1 | |
| Example 12³ | Toluene / Anisole | 5 / 0.5 | 70 | 2.0 | 215 | 88.3 | |
| Example 13 | Toluene / Ethyl acetate | 30 / 0.15 | r.t. | 19-20 | 85.0 | 95.9 | 0.339 |
| Example 14 | Toluene / Allyl acetate | 30 / 0.15 | r.t. | 19-20 | 102.1 | 94.8 | 0.333 |
| Example 15 | Toluene / Butyl acetate | 30 / 0.15 | r.t. | | 86.8 | 95.5 | 0.319 |
| Example 16 | Toluene / Ethyl oxalate | 30 / 0.15 | r.t. | 24-25 | 98.3 | 95.4 | 0.345 |
| Example 17 | Toluene / Acetic anhydride | 30 / 0.10 | r.t. | 19-20 | 75.0 | 94.3 | 0.355 |
| Example 18 | Toluene / Acetone | 30 / 0.15 | r.t. | 5×25 | 97.1 | 93.6 | 0.375 |
| Example 19 | Toluene / Methylethyl ketone | 30 / 0.15 | r.t. | 5×24 | 100.9 | 94.7 | 0.349 |
| Example 20 | Toluene / Cyclohexane | 30 / 0.15 | r.t. | 5×24 | 100.5 | 95.6 | 0.357 |
| Example 21 | Toluene / Styrene oxide | 30 / 0.15 | r.t. | 6×24 | 73.0 | 94.0 | 0.355 |
| Example 22 | Toluene / Acetyl acetone | 30 / 0.10 | r.t. | 6×24 | 74.2 | 94.1 | 0.381 |
| Example 23 | Toluene / Benzaldehyde | 30 / 0.15 | r.t. | 2×24 | 76.8 | 94.0 | 0.350 |
| Example 24 | Toluene / Amyl alcohol | 30 / 0.075 | r.t. | 2×24 | 78.4 | 94.2 | 0.376 |
| Example 25 | Toluene / 1,4-butanediol | 30 / 0.01 | r.t. | 2×24 | 75.4 | 94.7 | 0.359 |
| Example 26 | Toluene / Anisole | 5 / 0.5 | 70 | 2.0 | 147.7 | 94.3 | 0.358 |
| Comparative 8 | | | | | 53.2 | 87.2 | |
| Example 27 | Kerosene / Anisole | 5 / 0.3 | 60 | 2.0 | 78.8 | 94.8 | 0.362 |
| Example 28 | n-Heptane / Anisole | 5 / 0.3 | 60 | 2.0 | 83.3 | 95.4 | 0.351 |
| Example 29 | Hexane / Anisole | 5 / 0.3 | 60 | 2.0 | 90.1 | 94.9 | 0.349 |
| Example 30 | Trichloroethylene / Anisole | 5 / 0.3 | 60 | 2.0 | 75.2 | 95.6 | 0.371 |
| Example 31 | Benzene / Anisole | 5 / 0.3 | 60 | 2.0 | 142.3 | 95.8 | 0.367 |
| Example 32 | Chlorobenzene / Anisole | 5 / 0.3 | 60 | 2.0 | 125.9 | 96.1 | 0.355 |
| Example 33⁴ | Toluene / Anisole | 5 / 0.5 | 70 | 2.0 | 199.6 | 96.3 | 0.387 |
| Example 34⁴ | Toluene / Anisole | 5 / 0.5 | 70 | 2.0 | 89.8 | 85.8 | 0.286 |
| Comparative 9⁴ | | | | | 50.2 | 81.9 | 0.251 |
| Example 35⁴ | Toluene / Anisole | 5 / 0.5 | 70 | 2.0 | 26 | 91.3 | |
| Comparative 10⁴ | | | | | 15 | 85.6 | |

¹ The amount stands for a molar part of each extraction solvent added to 1 molar part of the titanium trichloride composition.
² The procedure will be described below in the description of Example 11 and Comparative Example 7.
³ The procedure of Example 11 was repeated except that 0.014 g. of the extracted titanium trichloride composition was used and the polymerization was carried out at a temperature of 80° C. for 8 hours.
⁴ The procedures employed will be described in the Example 33, Example 34 and Comparative Example 9, Example 35 and Comparative Example 10, respectively.

EXAMPLE 11 AND COMPARATIVE EXAMPLE 7

The inside of a 2-liter autoclave was sufficiently purged with a nitrogen gas. A glass ampoule containing 0.2 g.

flushed, and the catalyst was deactivated with the addition of methanol. Polypropylene was obtained in an amount of 383.1 g. It had a crystallinity of 96.3% and an [η] of 2.55.

When the foregoing procedure was repeated except that TiCl₃(AA) mentioned above was used as a titanium trichloride composition not extracted and washed with toluene, polypropylene was obtained in an amount of 163 g. It had an [$\eta$] of 2.82 and a crystallinity of 90.1% (Comparative Example 7).

EXAMPLE 33

A 1-liter separable four-necked flask equipped with a inlet for insertion of a thermometer, a nitrogen inlet, and an exhaust outlet was charged with 3.8 liters of refined kerosene and 120 g. of potassium titanium fluoride, and with stirring, the inside of the flask was sufficiently purged with nitrogen. Ethylaluminum dichloride (254 g.) was then added, and these components were reacted for 6 hours at 60° C. The product was cooled to room temperature, and allowed to stand. The supernatant liquid was recovered. The concentration of organoaluminum compound based on aluminum in the supernatant liquid was 0.237 mol/liter.

A 1-liter separable four-necked flask equipped with a stirrer, a propylene inlet, a thermometer and an exhaust pipe was charged with 500 ml. of refined kerosene. With stirring, the inside of the flask was fully purged with nitrogen, and then 42 ml. of a solution of the resulting organoaluminum compound in kerosene were charged into the flask. Subsequently, 2.00 g. of the titanium trichloride composition prepared in Example 2 were added, and the temperature was raised to 70° C. Polymerization of propylene and post-treatment of the resulting polypropylene were carried out as in Example 2. The yield of the solid polymer (polypropylene) was 199.6 g., and it had a bulk apparent density of 0.387 and a crystallinity of 96.3%.

EXAMPLE 34 AND COMPARATIVE EXAMPLE 9

The polymerization of propylene was performed in the same manner as set forth in Example 2 except that 10 millimols of ethylaluminum ethoxychloride instead of diethylaluminum chloride were used and the polymerization was performed for two hours. The yield of polypropylene was 89.8 g., and it had a crystallinity of 85.8% and a bulk density of 0.286.

When the foregoing procedure was repeated except that TiCl₃(AA) was used as a titanium trichloride composition not extracted with toluene, the amount of total polypropylene yielded was 50.2 g., and it had a crystallinity of 81.9% and a bulk density of 0.251 (Comparative Example 9).

EXAMPLE 35 AND COMPARATIVE EXAMPLE 10

Using the apparatus used in Example 2, 2.00 g. of the same titanium trichloride composition as used in Example 2, and 20 millimols of diethylaluminum chloride were added. With stirring, the mixture was heated to 40° C., and 70 ml. of 4-methyl-1-pentene were added dropwise over a period of 10 minutes. The polymerization was performed for one hour, and the product was post-treated in the same way as set forth in Example 2. The yield of the polymer produced was 26 g., and it had a crystallinity of 91.3%.

When the foregoing procedure was repeated except that a titanium trichloride composition not extracted (TiCl₃AA)

and washed with toluene was used, the polymer was obtained in an amount of 15 g., and it had a crystallinity of 85.6% (Comparative Example 10).

EXAMPLE 36 AND COMPARATIVE EXAMPLES 11 TO 16

Extraction 200 g. of the pulverized titanium trichloride composition (TiCl₃AA) obtained in Example 2 were extracted at 50° C. for 4 hours in 1-liter glass flask equipped with a stirrer, thermometer, dropping funnel and nitrogen gas inlet and outlet line, with a solvent mixture consisting of 500 ml. of toluene and 0.12 mole of α-picoline while stirring.

Separation of the titanium trichloride composition from the solvent mixture by means of a glass filter plate was carried out. Then, the composition was washed with refined toluene three times to remove the residual solvent mixture in the composition as completely as possible. The drying under vacuum gave improved titanium trichloride compositions.

Polymerization of propylene

A 1-liter glass polymerization vessel equipped with a stirrer, a thermometer, a propylene gas-inlet and an exhaust line was fed with 500 ml. of refined kerosene and the system was substantially purged with nitrogen. Ten millimoles (1.99 g.) of the titanium trichloride composition obtained above and 10 millimoles of diethylaluminum chloride were added to the system which was then heated to a temperature of 70° C. The polymerization was performed at 70° C. for 2 hours at an atmospheric pressure while introducing propylene. After completion of the polymerization, the catalyst was decomposed with methanol followed by separation of solid polymer from the liquid phase by filtration. The solid polymer was dried at 80° C. under reduced pressure. The kerosene layer of polymer solution was concentrated to determine the amount of polymer dissolved in kerosene. The total yield of polymer was the sum of the amounts of the polymers both in the solid and dissolved forms.

The results of polymerization obtained using each of titanium trichloride compositions and hydrogen-reduced titanium trichloride were as shown in Table II-a.

TABLE II-a

| | TiCl₃ component | | | | | | | Polypropylene | | |
|---|---|---|---|---|---|---|---|---|---|---|
| | Milling treatment step | | | | Extraction treatment step | | | | | |
| | | Auxiliary component | | | | | | | | |
| | | | Amount | | | | Organo-aluminum compound | Total yield (g.) | T.I. (per-cent) | A.D. (g./cc.) |
| Reduction | Yes or no | Class | Ml. | Mol | Yes or no | Solvent | | | | |
| Example 36 ..... Al | | Yes | | | Yes | Toluene plus α-picoline. | (C₂H₅)₂AlCl | 152.5 | 95.1 | 0.379 |
| Control ..... Al | | No | | | No | | (C₂H₅)₂AlCl | 6.5 | 93.3 | 0.369 |
| Comparative 11. Al | | Yes | | | No | | (C₂H₅)₂AlCl | 63.2 | 93.2 | 0.377 |
| Comparative 12. Al | | No | | | Yes | Toluene plus α-picoline. | (C₂H₅)₂AlCl | 6.7 | 92.9 | 0.353 |
| Comparative 13. Al | | Yes | | | Yes | Toluene plus α-picoline (extracted before milling). | (C₂H₅)₂AlCl | 63.8 | 89.6 | -------- |
| Comparative 14. Al | | Yes | | | Yes | 1st α-picoline, 2nd toluene (extracted with two solvents one by one). | (C₂H₅)₂AlCl | 6.0 | 89.7 | -------- |
| Comparative 15. Al plus toluene plus α-picoline. | | No | | | Yes | Toluene plus α-picoline. | (C₂H₅)₂AlCl | 52.0 | 88.8 | -------- |
| Comparative 16. Hydrogen | | Yes | (¹) | 1.5 / 0.015 | Yes | do | (C₂H₅)₂AlCl | 64.4 | 90.1 | -------- |

¹ Toluene/α-picoline.

EXAMPLES 37 TO 52 AND COMPARATIVE EXAMPLES 17 TO 19

Extraction

In a 500 ml. glass flask equipped with a stirrer, a thermometer, a dropping funnel and nitrogen gas inlet and outlet line were placed a solvent mixture consisting of 300 ml. of toluene and a nitrogen-containing compound the amount and class of which are indicated in Table II-b. Extraction was carried out at a temperature for a period indicated in such table. Separation of the titanium trichloride composition from the solvent mixture was carried out by means of a glass filter plate followed by washing the composition with refined toluene several times and successively drying under reduced pressure at room temperature.

Polymerizations were performed using the resultant titanium trichloride compositions in the same manner as in Example 36. The results were as illustrated in Table II-b.

When the foregoing procedure is repeated except that a titanium trichloride composition not extracted and washed with toluene was used, polypropylene was obtained in an amount of 84 g. It had a bulk density of 0.279 and a crystallinity of 82.5% (Comparative Example 18).

EXAMPLE 51 AND COMPARATIVE EXAMPLE 19

The polymerization of propylene was performed in the same manner as set forth in Example 36 except that 2 g. (10 mmol) of the titanium trichloride composition of Example 36 and 10 millimols of ethylaluminum ethoxychloride instead of diethylaluminum chloride were used and the polymerization was performed for two hours. The yield of total polypropylene was 135.8 g., and it had a crystallinity of 86.3%.

When the foregoing procedure was repeated except that a titanium trichloride composition not extracted with toluene was used, the amount of total polypropylene

TABLE II-b

| | TiCl₃ component | | | | Polypropylene | | |
|---|---|---|---|---|---|---|---|
| | Extraction solvents | | Extraction conditions | | Total yield (g.) | T.I. (percent) | A.D. (g./cc.) |
| | Class | Amount[1] | °C. | Hours | | | |
| Example 37 | Toluene / α-Picoline | 500 / 0.12 | 50 | 44 | 152.5 | 95.1 | 0.379 |
| Example 38 | Toluene / Pyridine | 300 / 0.1 | r.t. | 48 | 138.5 | 96.1 | 0.378 |
| Example 39 | Toluene / 2-chloropyridine | 300 / 0.1 | r.t. | 48 | 151.2 | 95.6 | 0.362 |
| Example 40 | Toluene / Quinoline | 300 / 0.1 | r.t. | 48 | 120.1 | 94.4 | 0.366 |
| Example 41 | Toluene / Tributyl amine | 300 / 0.1 | r.t. | 48 | 112.3 | 96.0 | 0.371 |
| Example 42 | Toluene / Trihexyl amine | 300 / 0.1 | r.t. | 48 | 120.6 | 94.5 | 0.362 |
| Example 43 | Toluene / Triphenyl amine | 300 / 0.1 | 60 | 2 | 133.1 | 94.7 | 0.372 |
| Example 44 | Toluene / Diphenylmethyl amine | 300 / 0.1 | 60 | 2 | 141.3 | 95.3 | 0.365 |
| Example 45 | Toluene / N,N-dimethyl aniline | 300 / 0.1 | 60 | 2 | 121.7 | 95.0 | 0.360 |
| Example 46 | Toluene / N-ethyl morpholine | 300 / 0.1 | 60 | 2 | 99.2 | 95.7 | .331 |
| Example 47 | Toluene / Toluyl isocyanate | 300 / 0.1 | 60 | 2 | 90.3 | 95.3 | 0.354 |
| Example 48 | Toluene / Azobenzene | 300 / 0.1 | 60 | 2 | 108.0 | 94.8 | 0.361 |
| Example 49 | Toluene / Piperidine | 300 / 0.1 | 60 | 2 | 89.3 | 94.4 | 0.351 |
| Comparative 17 | Toluene / N,N-dimethyl acetamide | 300 / 0.1 | 60 | 2 | 42.8 | 92.8 | 0.341 |
| Example 50[2] | Toluene / α-Picoline | 500 / 0.12 | 50 | 4 | 158 | 87.8 | 0.340 |
| Comparative 18.[2] | | | | | 84 | 82.5 | 0.279 |
| Example 51[2] | Toluene / α-Picoline | 500 / 0.12 | 50 | 4 | 135.8 | 86.3 | |
| Comparative 19.[2] | | | | | 55.6 | 82.1 | |
| Example 52[2] | Toluene / α-Picoline | 500 / 0.12 | 50 | 4 | 29 | 93.1 | |

[1] The amount is indicated in milliliters in the case of toluene; in molar ratio per mole of TiCl₃ in the case of the nitrogen-containing compound.
[2] The procedures were shown in the following descriptions of Example 50 and Comparative Example 18, Example 51 and Comparative Example 19 and Example 52 respectively.

EXAMPLE 50 AND COMPARATIVE EXAMPLE 18

The inside of a 2-liter autoclave was sufficiently purged with a nitrogen gas. A glass ampoule containing 0.017 g. of the same titanium trichloride component as used in Example 36 was mounted in a thermometer fitting pipe in the autoclave so that upon rotation of a stirrer, the stirring vanes would collide with the ampoule and break it. The inside of the autoclave was further purged with propylene gas, and 460 g. of propylene and 7.5 millimols of diethylaluminum chloride were introduced into the autoclave at room temperature, followed by introduction of 2200 ml. of hydrogen. The sytem was heated to 80° C., and then the stirrer was operated. On breakage of the ampoule, the polymerization of propylene was started. After polymerizing for 8 hours, unreacted propylene was flushed, and the catalyst was deactivated with the addition of methanol. Polypropylene was obtained in an amount of 158 g. It had a bulk density of 0.340, a crystallinity of 87.8% and an [η] of 3.58.

yielded was 55.6 g., and it had a crystallinity of 82.1% (Comparative Example 19).

EXAMPLE 52

Using the apparatus used in Example 36, 2.0 g. of the same titanium trichloride composition as used in Example 36, and 20 millimols of diethylaluminum chloride were added. With stirring, the mixture was heated to 40° C., and 70 ml. of 4-methyl-1-pentene were added dropwise over a period of 10 minutes. The polymerization was performed for one hour, and the product was post-treated in the same way as set forth in Example 36. The yield of the polymer produced was 29 g., and it had a crystallinity of 93.1.

EXAMPLE 53 AND COMPARATIVE EXAMPLES 20 TO 25

Activation

A 800 ml. stainless steel cylindrical vessel was charged with 120 g. of an unpulverized titanium trichloride composition obtained in the same way as set forth in Example 2, and the material was pulverized for 24 hours without any particular heating or cooling by means of a vibratory mill in the presence of 850 stainless steel balls each having a diameter of 10 mm.

Extraction 200 g. of the pulverized composition obtained were extracted with a mixed solvent consisting of 500 ml. of toluene and 20 ml. of polymethylsiloxanes having a viscosity of 20 centistokes represented by the general formula

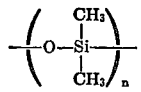

at 70° C. for 2 hours with stirring. The titanium chloride composition was recovered by filtration from the mixed solvent, and washed three times with pure toluene to remove the remaining mixed solvent, followed by drying *in vacuo* to form a modified titanium trichloride composition.

Polymerization

Polymerization of propylene was performed using the modified titanium trichloride composition in the same manner as set forth in Example 1. The results are shown in Table III–a.

TABLE III-a

| | TiCl₃ component | | | | | | Polypropylene | | |
|---|---|---|---|---|---|---|---|---|---|
| | | Milling treatment step | | Extraction treatment step | | | | | |
| | | | Auxiliary component | | | Organo-aluminum compound | Total yield (g.) | T.I. (percent) | A.D. (g./cc.) |
| | Reduction | Yes or no | Class | Amount, ml. | Yes or no | Solvent | | | |
| Example 53 | Al | Yes | | | Yes | Toluene/polymethyl siloxane. | $(C_2H_5)_2Al$ | 118.3 | 94.1 | 0.369 |
| Control | Al | No | | | No | | $(C_2H_5)_2Al$ | 6.0 | 93.3 | 0.369 |
| Comparative 20 | Al | Yes | | | No | | $(C_2H_5)_2Al$ | 63.2 | 93.2 | 0.377 |
| Comparative 21 | Al | No | | | Yes | Toluene/polymethyl siloxane. | $(C_2H_5)_2Al$ | 6.7 | 92.9 | 0.353 |
| Comparative 22 | Al | Yes | | | Yes | Toluene/polymethyl siloxane (extracted before milling). | $(C_2H_5)_2Al$ | 68.9 | 88.0 | |
| Comparative 23 | Al | Yes | | | Yes | Toluene | $(C_2H_5)_2Al$ | 71.5 | 93.5 | 0.366 |
| Comparative 24 | Al plus toluene polymethyl siloxane. | No | | | Yes | Toluene/polymethyl siloxane. | $(C_2H_5)_2Al$ | 73.5 | 87.0 | |
| Comparative 25 | Hydrogen | Yes | Toluene/polymethyl siloxane. | 1.5 | Yes | do | $(C_2H_5)_2Al$ | 67.4 | 89.2 | 0.341 |

EXAMPLES 54 TO 77 AND COMPARATIVE EXAMPLES 26 TO 28

The procedure of Example 53 was repeated except that varied conditions were used. The results are shown in Table III–b.

TABLE III-b

| | TiCl₃ component | | Polypropylene | | |
|---|---|---|---|---|---|
| | Class | Amount | Total yield (g.) | T.I. (percent) | A.D. (g./cc.) |
| Example 54 | Chlorobenzene / Hexamethyl disiloxane | 300 ml. / 45.3 mM | 141.2 | 93.8 | 0.362 |
| Example 55 | Chlorobenzene / Diphenyl dichlorosilane | 300 ml. / 45.3 mM | 101.3 | 95.1 | 0.344 |
| Example 56 | Chlorobenzene / Vinylmethyl dichlorosilane | 300 ml. / 45.3 mM | 93.2 | 94.0 | 0.344 |
| Example 57 | Chlorobenzene / Phenyl trichlorosilane | 300 ml. / 45.3 mM | 103.7 | 94.4 | 0.399 |
| Example 58 | Chlorobenzene / Hexamethyl silazane | 300 ml. / 45.3 mM | 109.5 | .9 | 0.371 |
| Example 59 | Chlorobenzene / Octamethyl cyclotetrasiloxane | 300 ml. / 45.3 mM | 139.8 | 93.6 | 0.353 |
| Comparative 26 | | | 6.5 | 93.3 | 0.369 |
| Comparative 27 | Toluene / Polymethyl siloxane (kinematic viscosity 20 cs.) | 500 ml. / 20 ml. | 6.7 | 92.9 | 0.353 |
| Example 60 | Chlorobenzene / Silicon oil (1) | 300 ml. / 9 ml. | 125.0 | 94.3 | 0.377 |
| Example 61 | Chlorobenzene / Silicon oil (2) | 300 ml. / 9 ml. | 140.0 | 93.7 | 0.379 |
| Example 62 | Chlorobenzene / Silicon oil (3) | 300 ml. / 9 ml. | 90.2 | 93.3 | 0.331 |
| Example 63 | Toluene / Triphenyl silane | 100 ml. / 50 ml. | 121.5 | 95.3 | 0.362 |
| Example 64 | Toluene / N-methyl hexamethyl silazane | 100 ml. / 50 ml. | 130.3 | 94.6 | 0.366 |
| Example 65 | Toluene / Triphenyl silicon isocyanate | 100 ml. / 10 ml. | 96.1 | 93.4 | 0.325 |
| Example 66 | Toluene / p-Methoxy phenyl trimethyl silane | 100 ml. / 50 ml. | 145.2 | 95.1 | 0.354 |
| Example 67 | Toluene / Trimethylsilyl acetone | 100 ml. / 30 ml. | 103.3 | 93.9 | 0.349 |
| Example 68 [1] | Toluene / Polymethyl siloxane (kinematic viscosity 20 cs.) | 500 ml. / 20 ml. | 124 | 89 | 0.355 |
| Example 69 [2] | Toluene / Polymethyl siloxane (kinematic viscosity 20 cs.) | 500 ml. / 20 ml. | 105.1 | 86.3 | |
| Comparative 28 | | | 53.5 | 81.2 | |

TABLE III-b—Continued

| | TiCl₃ component | | Polypropylene | | |
|---|---|---|---|---|---|
| | Class | Amount | Total yield (g.) | T.I. (percent) | A.D. (g./cc.) |
| Example 70 [3] | Toluene | 500 ml | 23 | 92.3 | |
| | Polymethyl siloxane (kinematic viscosity 20 cs.) | 20 ml | | | |
| Example 71 | Benzene | 300 ml | 125.3 | 95.2 | 0.377 |
| | Dimethyl polysiloxane | 6 ml | | | |
| Example 72 | Kerosene | 300 ml | 105.2 | 94.8 | 0.369 |
| | Dimethyl polysiloxane | 6 ml | | | |
| Example 73 | Hexane | 300 ml | 87.7 | 93.8 | 0.354 |
| | Dimethyl polysiloxane | 6 ml | | | |
| Example 74 | Heptane | 300 ml | 89.9 | 94.1 | 0.345 |
| | Dimethyl polysiloxane | 6 ml | | | |
| Example 75 | p-Xylene | 300 ml | 110.3 | 94.9 | 0.366 |
| | Dimethyl polysiloxane | 6 ml | | | |
| Example 76 | Trichloroethylene | 300 ml | 80.5 | 93.9 | 0.344 |
| | Dimethyl polysiloxane | 6 ml | | | |
| Example 77 | Carbon disulfide | 300 ml | 83.9 | 93.7 | 0.369 |
| | Dimethyl polysiloxane | 6 ml | | | |

[1] Polymerization of propylene was performed in the same way as set forth in Example 50 except that the titanium trichloride composition as used in Example 53 was employed in an amount of 0.015 g.
[2] Polymerization of propylene was performed in the same way as set forth in Example 51.
[3] Polymerization of 4-methyl-1-pentene was performed in the same way as in Example 52.

The silicone oil (1) in Example 60 has the following structural units:

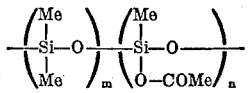

Me: CH₃ group $$\frac{n}{m+n}: 0.05$$

K. vis.=20 cs.

The silicone oil (2) in Example 61 has the following structural units:

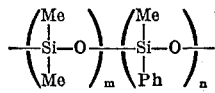

Me: CH₃ group
Ph: Phenyl group $$\frac{n}{m+n}: 0.22$$

K. vis.=55 cs.

The structural units of the silicone oil (3) used in Example 62 are as follows:

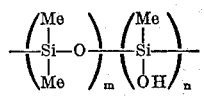

Me: CH₃ group $$\frac{n}{m+n}: 0.03$$

K. vis.=32 cs.

What we claim is:

1. In a process for polymerizing or copolymerizing a monomer selected from the group consisting of ethylene, propylene, 1-butene, 4-methyl-1-pentene, styrene, 1-pentene, 1-hexene and 3-methyl-1-butene in the presence of a catalyst composed of a pulverized titanium trichloride component and an organo-aluminum compound, the improvement wherein said monomer is polymerized or copolymerized in the presence of a catalyst comprising:

(A) a titanium trichloride composition obtained by pulverizing a component consisting of an aluminum-containing titanium trichloride component prepared by the reduction of titanium tetrachloride with metallic aluminum, until the α- or γ-type crystal structure of said titanium trichloride cannot be identified in the X-ray diffraction pattern, and extracting the resulting titanium trichloride composition with a solvent mixture of an inert organic solvent:

(1) selected from the group consisting of aromatic hydrocarbons having 6 to 20 carbon atoms, saturated aliphatic hydrocarbons having 3 to 20 carbon atoms, alicyclic hydrocarbons having 3 to 18 carbon atoms, acyclic or cyclic olefins of 2 to 20 carbon atoms, unsaturated aliphatic hydrocarbon halides of 2 to 20 carbon atoms, saturated aliphatic hydrocarbon halides of 1 to 20 carbon atoms, halogenated aromatic hydrocarbons having 6 to 16 carbon atoms and carbon disulfide; and a member selected from the group consisting of the following organic solvents;

(2) an oxygen-containing organic solvent selected from the group consisting of saturated aliphatic monoethers having 2 to 32 carbon atoms having an alkyl radical, aliphatic ethers of 3 to 20 carbon atoms having at least one unsaturated aliphatic hydrocarbon radical, aromatic ethers of 7 to 16 carbon atoms having a saturated alkyl or aryl radical, monoethers and diethers of 7 to 16 carbon atoms which are halogenated and contain at least one aromatic radical, saturated alkyl esters of saturated aliphatic monocarboxylic acids having an aliphatic monocarboxylic acid residual group with 1 to 21 carbon atoms and a saturated alkyl group with 1 to 16 carbon atoms, unsaturated alkyl esters of saturated aliphatic monocarboxylic acids having a saturated aliphatic monocarboxylic acid residual group with 1 to 8 carbon atoms and an unsaturated alkyl group with 2 to 12 carbon atoms, alkyl esters of unsaturated aliphatic monocarboxylic acids having an unsaturated aliphatic monocarboxylic acid residual group with 2 to 12 carbon atoms and a saturated or unsaturated alkyl group with 1 to 10 carbon atoms, saturated alkyl esters of aromatic monocarboxylic acids having an aromatic monocarboxylic acid residual group with 7 to 18 carbon atoms and a saturated alkyl group with 1 to 20 carbon atoms, saturated aliphatic monoalcohols having 1 to 18 carbon atoms, monohydric and dihydric phenols having 6 to 16 carbon atoms, saturated aliphatic monoketones having 3 to 20 carbon atoms, saturated aliphatic diketones having 4 to 12 carbon atoms, aromatic monoketones having 7 to 18 carbon atoms, aromatic monocarboxylic acids having 7 to 18 carbon atoms, saturated aliphatic monocarboxylic acids having 1 to 20 carbon atoms, saturated aliphatic carboxylic acid halides having 2 to 12 carbon atoms and aromatic carboxylic acid halides having 7 to 15 carbon atoms;

(2)' a nitrogen-containing organic solvent selected from the group consisting of nitrogen-containing heterocyclic amines having 5 to 18 carbon atoms selected from the pyridine, quinoline and acridine series, saturated aliphatic secondary amines of 2 to 24 carbon atoms, aromatic secondary amines having 6 to 20 carbon atoms, saturated aliphatic tertiary amines having 3 to 18 carbon atoms, aromatic tertiary amines having 8 to 30 carbon atoms, aromatic mononitriles having 7 to 15 carbon atoms, aromatic monoisocyanates having 7 to 11 carbon atoms and aromatic azo compounds having 12 to 20 carbon atoms; and (2)'' a Si-containing organic solvent selected from the group consisting of tetrahydrocarbylsilanes having saturated alkyl radicals, aryl radicals or mixtures thereof of 4 to 50 carbon atoms, tetrahydrocarbylsilanes having an unsaturated alkyl radical of 5 to 28 carbon atoms, alkyl hydrogenosilanes of 1 to 30 carbon atoms having an Si-H bond, aryl hydrogenosilanes of 6 to 30 carbon atoms having an Si-H bond, alkyl halogenosilanes of 3 to 30 carbon atoms having an Si-halogen bond, aryl halogenosilanes of 6 to 30 carbon atoms having an Si-halogen bond, trialkyl silylamines of 6 to 9 carbon atoms, triphenyl silylamine, trimethyl(N - methylamino) silane, trimethyl(N - diethylamino)silane, saturated alkylsilanes having at least one Si-O-C bond of 2 to 8 carbon atoms, aryl silanes having at least an Si-O-C bond of 9 to 12 carbon atoms, $C_1$–$C_{10}$ aliphatic mono-or $C_7$–$C_{11}$ aromatic mono-carboxylic acid esters of trialkyl silanols having 3 to 10 carbon atoms, alkylaryl silanols having 8 to 20 carbon atoms or triaryl silanes of 18 to 30 carbon atoms, trialkyl silicon isocyanates having 3 to 10 carbon atoms, dialkyl aryl silicon isocyanates having 8 to 15 carbon atoms, trialkyl silicon isocyanates having 18 to 30 carbon atoms, polysilmethylenes of the formula $$CH_3SiCH_2[(CH_3)_2SiCH_2]_xSi(CH_3)_3$$

wherein $x$ is an integer of 1 to 10, linear polyalkyl or polyaryl polysilanes of 6 to 80 carbon atoms, $\alpha$, $\gamma$-dihaloalkylpolysiloxanes of the formula $$X(R_2SiO)_xSiR_2X$$

wherein X is a halogen atom, and
$x = 1$ to 1000,
polyalkyl cyclopolysilanes having 12 to 120 carbon atoms, polyaryl cyclopolysilanes having 12 to 120 carbon atoms, organopolysiloxanes of the formula $$R(R'R''''SiO)_xSiR_3$$

wherein
R, R' and R'''' may be the same or diffferent and represent an alkyl group having 1 to 4 carbon atoms, an aryl group having 6 to 8 carbon atoms, or hydrogen,
and $x$ is an integer of 1 to 1000,
alkyl cyclopolysiloxanes of the formula $$(R'''HSiO)_y$$

wherein
R''' is an alkyl group having 1 to 4 carbon atoms, and $y$ is an integer of 3 to 8,
alkyl cyclopolysiloxanes of the general formula $$(R''''_2SiO)_z$$

wherein
R'''' is an alkyl group having 1 to 4 carbon atoms, and $z$ is an integer of 3 to 9,
aryl cyclopolysiloxanes of the formula $$(Q_2SiO)_p$$

wherein
Q is an aryl group having 6 to 8 carbon atoms, and $p$ is an integer of 3 to 6,
alkyl or aryl polysilazanes of 6 to 50 carbon atoms having an Si-N-Si bond and a molecular weight of not more than 1000; and then separating said extracted titanium trichloride composition from the solvent mixture, the amount of said mixed solvent being 1 to 100 parts by weight per part of the pulverized aluminum-containing titanium trichloride component, and the amount of the solvent (2) or (2)'' being 0.005–10.0 parts by weight per part of said titanium trichloride component and the amount of solvent (2)' being 0.005–0.5 part by weight per part of said titanium trichloride component; and (B) an organoaluminum compound selected from the group consisting of trialkyl aluminum, dialkylaluminum halide, dialkylaluminum alkoxide, alkylaluminum alkoxy halide, reaction products of these with an electron-donor compound, reaction products of these with an alkali metal complex fluoride of a transition metal, reaction products of an alkylaluminum dihalide with an electron-donor compound, reaction products of an alkylaluminum dihalide with an alkali metal halide, and reaction products of an alkylaluminum dihalide with an alkali metal complex fluoride of a transition metal.

2. A catalyst comprising:
(A) a titanium trichloride composition obtained by pulverizing a component consisting of an aluminum-containing titanium trichloride component prepared by the reduction of titanium tetrachloride with metallic aluminum, until the $\alpha$- or $\gamma$-type crystal structure of said titanium trichloride cannot be identified in the X-ray diffraction pattern, and extracting the resulting titanium trichloride composition with a solvent mixture of an inert organic solvent:

(1) selected from the group consisting of aromatic hydrocarbons having 6 to 20 carbon atoms, saturated aliphatic hydrocarbons having 3 to 20 carbon atoms, alicyclic hydrocarbons having 3 to 18 carbon atoms, acyclic or cyclic olefins of 2 to 20 carbon atoms, unsaturated aliphatic hydrocarbon halides of 2 to 20 carbon atoms, saturated aliphatic hydrocarbon halides of 1 to 20 carbon atoms, halogenated aromatic hydrocarbons having 6 to 16 carbon atoms and carbon disulfide; and a member selected from the group consisting of the following organic solvents;

(2) an oxygen-containing organic solvent selected from the group consisting of saturated aliphatic monoethers having 2 to 32 carbon atoms having an alkyl radical, aliphatic ethers of 3 to 20 carbon atoms having at least one unsaturated aliphatic hydrocarbon radical, aromatic ethers of 7 to 16 carbon atoms having a saturated alkyl group or aryl group, mono- or diethers having a halogen-substituted aromatic group with 7 to 16 carbon atoms, saturated alkyl esters of saturated aliphatic monocarboxylic acids having a saturated aliphatic monocarboxylic acid residual group with 1 to 21 carbon atoms and a saturated alkyl group with 1 to 16 carbon atoms, unsaturated alkyl esters of saturated aliphatic monocarboxylic acids having a saturated aliphatic monocarboxylic acid residual group with 1 to 8 carbon atoms and an unsaturated alkyl group with 2 to 12 carbon atoms, alkyl esters of unsaturated aliphatic monocarboxylic acids having an unsaturated aliphatic monocarboxylic acid residual group with 2 to 12 carbon atoms and a saturated or unsaturated alkyl group with 1 to 10 carbon atoms, saturated alkyl esters of aromatic monocarboxylic acids having an aromatic monocarboxylic acid residual group with 7 to 18 carbon atoms and a saturated alkyl group with 1 to 20 carbon atoms, saturated aliphatic mono-alcohols having 1 to 18 carbon atoms, monohydric and dihydric phenols having 6 to 16 carbon atoms, saturated aliphatic monoketones having 3 to 20 carbon atoms, saturated aliphatic diketones having 4 to 12 carbon atoms, aromatic monoketones having 7 to 18 carbon atoms, aromatic monocarboxylic acids having 7 to 18 carbon atoms, saturated aliphatic monocarboxylic acids having 1 to 20 carbon atoms, saturated aliphatic carboxylic acid halides having 2 to 12 carbon atoms and aromatic carboxylic acid halides having 7 to 15 carbon atoms;

(2)' a nitrogen-containing organic solvent selected from the group consisting of nitrogen-containing heterocyclic amines having 5 to 18 carbon atoms selected from the pyridine, quinoline and acridine series, saturated aliphatic secondary amines of 2 to 24 carbon atoms, aromatic secondary amines having 6 to 20 carbon atoms, saturated aliphatic tertiary amines having 3 to 18 carbon atoms, aromatic tertiary amines having 8 to 30 carbon atoms, aromatic mononitriles having 7 to 15 carbon atoms, aromatic monoisocyanates having 7 to 11 carbon atoms and aromatic azo compounds having 12 to 20 carbon atoms; and (2)" a Si-containing organic solvent selected from the group consisting of tetrahydrocarbylsilanes having saturated alkyl radicals, aryl radicals or mixtures thereof of 4 to 50 carbon atoms, tetrahydrocarbylsilanes having an unsaturated alkyl radical of 5 to 28 carbon atoms, alkyl hydrogenosilanes of 1 to 30 carbon atoms having an Si-H bond, aryl hydrogenosilanes of 6 to 30 carbon atoms having an Si-H bond, alkyl halogenosilanes of 3 to 30 carbon atoms having an Si-halogen bond, aryl halogenosilanes of 6 to 30 carbon atoms having an Si-halogen bond, trialkyl silylamines of 6 to 9 carbon atoms, triphenyl silylamine, trimethyl(N - methylamino)silane, trimethyl(N,N-diethylamino)silane, saturated alkylsilanes having at least one Si-O-C bond of 2 to 8 carbon atoms, aryl silanes having at least an Si-O-C bond of 9 to 12 carbon atoms, $C_1$–$C_{10}$ aliphatic mono- or $C_7$–$C_{11}$ aromatic mono-carboxylic acid esters of trialkyl silanols having 3 to 10 carbon atoms, alkylaryl silanols having 8 to 20 carbon atoms or triaryl silanes of 18 to 30 carbon atoms, trialkyl silicon isocyanates having 3 to 10 carbon atoms, dialkyl aryl silicon isocyanates having 8 to 15 carbon atoms, trialkyl silicon isocyanates having 18 to 30 carbon atoms, polysilmethylenes of the formula $$CH_3SiCH_2[(CH_3)_2SiCH_2]_xSi(CH_3)_3$$

wherein $x$ is an integer of 1 to 10, linear polyalkyl or polyaryl polysilanes of 6 to 80 carbon atoms, α,ω - dihaloalkylpolysiloxanes of the formula $$X(R_2SiO)_xSiR_2X$$

wherein X is a halogen atom and $x$=1 to 1000, polyalkyl cyclopolysilanes having 12 to 120 carbon atoms, polyaryl cyclopolysilanes having 12 to 120 carbon atoms, organopolysiloxanes of the formula $$R(R'R''''SiO)_xSiR_3$$

wherein
R' and R'''' may be the same or different and represent an alkyl group having 1 to 4 carbon atoms, an aryl group having 6 to 8 carbon atoms, or hydrogen, and $x$ is an integer of 1 to 1000, alkyl cyclopolysiloxanes of the formula $$(R'''HSiO)_y$$

wherein R''' is an alkyl group having 1 to 4 carbon atoms, and $y$ is an integer of 3 to 8, alkyl cyclopolysiloxanes of the general formula $$(R''''_2SiO)_z$$

wherein R'''' is an alkyl group having 1 to 4 carbon atoms, and $z$ is an integer of 3 to 9, aryl cyclopolysiloxanes of the formula $$(Q_2SiO)_p$$

wherein
Q is an aryl group having 6 to 8 carbon atoms, and $p$ is an integer of 3 to 6, alkyl or aryl polysilanzanes of 6 to 50 carbon atoms having an Si-N-Si bond and a molecular weight of not more than 1000; and then separating said extracted titanium trichloride composition from the solvent mixture, the amount of the mixed solvent being 1 to 100 parts by weight per part of the pulverized aluminum-containing titanium trichloride component, and the amount of the solvent (2) or (2)" being 0.005 to 10.0 parts by weight per part of said titanium trichloride component and the amount of solvent (2)' being 0.005–0.5 parts by weight per part of said titanium trichloride component, and (B) an organoaluminum compound selected from the group consisting of trialkyl aluminum, dialkylaluminum halide, dialkylaluminum alkoxide, alkylaluminum alkoxy halide, reaction products of these with an electron-donor compound, reaction products of these with an alkali metal complex fluoride of a transition metal, reaction products of an alkylaluminum dihalide with an electron-donor compound, reaction product of an alkylaluminum dihalide with an alkali metal halide, and reaction products of an alkylaluminum dihalide with an alkali metal complex fluoride of a transition metal.

References Cited

UNITED STATES PATENTS

| 3,130,005 | 4/1964 | Siggel et al. | 260—94.9 C |
| 3,482,935 | 12/1969 | Trementozzi et al. | 260—94.9 E |
| 3,032,510 | 5/1962 | Tornqvist et al. | 260—94.9 E |
| 3,365,434 | 1/1968 | Coover et al. | 260—94.9 C |

FOREIGN PATENTS

| 2,052,525 | 6/1971 | Germany. |
| 7015555 | 4/1971 | Netherlands. |

EDWARD J. SMITH, Primary Examiner

U.S. Cl. X.R.

252—429 B, 429 C, 93.5 S, 93.7, 94.9 C, 94.9 E